Patented Nov. 15, 1932

1,887,996

UNITED STATES PATENT OFFICE

ACHILLE CONZETTI, OF BASEL, SWITZERLAND, ASSIGNOR TO J. R. GEIGY S. A., OF BASEL, SWITZERLAND

MANUFACTURE OF STRONGLY BASIC AZO-DYESTUFFS

No Drawing. Original application filed July 28, 1928, Serial No. 296,102, and in Germany August 6, 1927. Divided and this application filed December 14, 1931. Serial No. 581,070.

This application is divisional of application Ser. No. 296,102, filed July 28, 1928.

The present invention relates to a process for the manufacture of strongly basic disazo-dyestuffs which consists in starting from a diazo compound, coupling therewith a meta-phenylenediamine derivative transformed by successive treatment with chloracetyl-chloride and pyridine, into a basic body containing the group

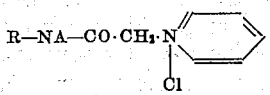

wherein R represents an aryl radical of the benzene and naphthalene series and A represents hydrogen, alkyl or aryl of the benzene series, diazotizing the monoazo body thus obtained and further coupling the diazo compound with azo components of the benzene and naphthalene series and phenylmethylpyrazolone.

The new dyestuffs in the form of their hydrochlorides are more or less easily soluble in cold water and have the properties of fast basic dyestuffs, that is to say they dye cotton with a tannin mordant intense and fast tints.

As compared with the known strongly basic azo-dyestuffs which contain the strongly basic group as a quaternary nitrogen attached either directly or through the $CH_2$ group to the benzene ring, the dyestuffs of this invention are characterized by containing the group —$NH.CO.CH_2$— as a bridge.

Since each free amino-group can be converted into this strongly basic group by smooth reaction there is the possibility of obtaining a very large number of new combinations, especially also by introducing several such strongly basic groups into the dyestuff molecule.

By suitable choice of a dyestuff which is fast to light and contains free amino-groups and is not useful in dyeing, there may be obtained by the process of this invention dyestuffs which dye with a tannin-mordant and yield on cotton tints of high fastness to light, complete fastness to washing, complete fastness to acids and alkali and yielding pure white discharges.

Also dyestuffs can be obtained which yield on weighted silk tints which are quite fast to washing and yield pure white discharges. Similarly, good dyeings may be produced on leather and jute.

The following examples illustrate the invention:

*Example 1.*—13.8 kilos of meta-nitraniline are dissolved at 80° C. in 100 litres of toluene and 13 kilos of chloracetylchloride are gradually added. By heating for several hours at 115° C. all the hydrochloric acid is expelled and on cooling the chloracetyl-meta-nitraniline separates completely in the form of white crystals melting at 116° C. It has the formula

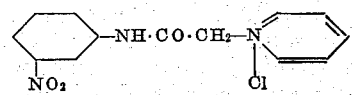

The chloracetyl-derivative is dissolved in 100 litres of pyridine and the solution is gradually heated, whereby the mass solidifies to a thickish crystal mass owing to separation of the product of reaction and heat is evolved. The whole is heated for a short time to boiling and then cooled, whereby the pyridoacetyl-meta-nitraniline is completely separated in crystalline form. The product may be obtained pure by crystallization from boiling water in the form of white slender needles which melt at 185° C.

By reduction with iron and acetic acid in known manner there is obtained smoothly an aqueous solution of pyridoacetyl-meta-phenylenediamine of the probable formula:

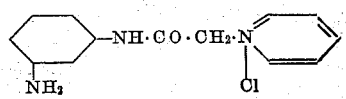

A solution of 26.35 kilos of this last-named base in 200 litres of water is diazotized by means of 15 kilos of concentrated hydrochloric acid and 6.9 kilos of sodium nitrite; the excess of mineral acid is neutralized by means of sodium acetate, more crystallized sodium acetate, amounting to 14 kilos, is added, and into the solution is run one of 10.8 kilos of meta-toluidine in 15 kilos of concentrated hydrochloric acid in 200 litres of water. The dyestuff thus formed is salted out, filtered, made into a paste with 500 litres of water and 30 kilos of concentrated hydrochloric acid, and diazotized while cold with the necessary quantity of sodium nitrite. The solution thus obtained is run into a solution of 14 kilos of beta-naphthol in 200 litres of water and 12.8 kilos of caustic soda lye of 30 per cent. strength, 15 kilos of crystallized sodium acetate being added. The dyestuff separates completely; it is filtered and dried. The dyestuff is soluble in water and dyes tannin-mordanted cotton red and weighted silk a pure red which gives a pure white discharge and is of good fastness to washing and light.

*Example 2.*—A feebly acid reduction liquor containing 26.35 kilos of pyridoacetyl-meta-phenylenediamine of the formula:

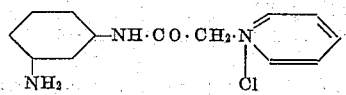

is mixed with 15 kilos of hydrochloric acid and then diazotized by means of 6.9 kilos of sodium nitrite; the mineral acid is neutralized by means of sodium acetate and the whole is run into a neutral solution of pyrido-acetyl-meta-phenylenediamine containing 15 kilos of crystallized sodium acetate.

The intermediate body is separated from the orange solution by addition of common salt; it is dissolved in 500 litres of water and 30 kilos of concentrated hydrochloric acid are added whereby the solution becomes intensely blue-red; diazotation follows by means of 6.9 kilos of sodium nitrite and the bright yellow diazo-solution is run into a solution of 14.5 kilos of beta-naphthol in 200 litres of water containing 13 kilos of caustic soda lye of 30 per cent. strength and 8 kilos of calcinated sodium carbonate. When coupling is complete the mixture is acidified with hydrochloric acid, heated and then allowed to cool, whereupon the disazo-dyestuff crystallizes.

The dyestuff has the following formula:

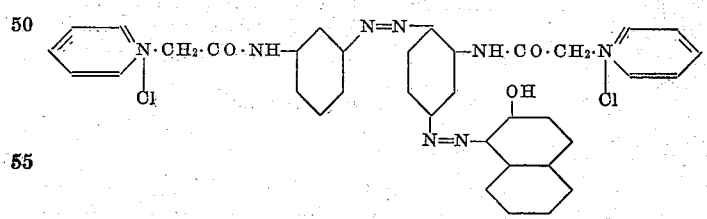

It is soluble in water and dyes tannin-mordanted cotton a pure bluish-red, very fast to washing. On weighted silk the dyeings are very fast to light and their fastness to washing fulfills the highest requirements.

The dyestuff from pyridoacetyl-para-phenylenediamine plus pyridoacetyl-meta-phenylenediamine plus pyridoacetyl-2:7-aminonaphthol constitutes a dark-red violet powder and yields a deep-red on tannin mordanted cotton. The dyestuff from pyrido-acetyl-para-phenylenediamine plus pyrido-acetyl-meta-phenylenediamine plus phenyl-methyl-pyrazolone constitutes a yellow-brown powder and yield an orange-yellow on tannin-mordanted cotton.

What I claim is:—

1. A process for the manufacture of strongly basic disazo-dyestuffs, consisting in starting from a diazotized aromatic amine of the benzene series, coupling therewith a meta-phenylenediamine derivative transformed by successive treatment with chloracetyl-chloride and pyridine, into a basic body containing the group:

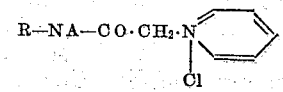

wherein R represents an aryl radical of the benzene and naphthalene series and A represents hydrogen, alkyl or aryl of the benzene series, diazotizing the monoazo body thus obtained and further coupling the diazo compound with azo components of the benzene and naphthalene series and phenyl-methylpyrazolone.

2. A process for the manufacture of strongly basic disazo-dyestuffs, consisting in treating meta-nitraniline with chloracetyl-chloride and pyridine, reducing the nitro compound to an amino compound, diazotizing the body thus obtained, coupling the diazo compound with pyridoacetyl-meta-phenylenediamine, again diazotizing and finally coupling with azo components of the benzene and naphthalene series and phenyl-methylpyrazolone.

3. A process for the manufacture of strongly basic disazo-dyestuffs, consisting in treating meta-nitraniline with chloracetyl-chloride and pyridine, reducing the nitro compound to an amino compound, diazotizing the body thus obtained, coupling the diazo compound with pyridoacetyl-meta-phenylenediamine, again diazotizing and finally coupling with beta-naphthol.

4. The strongly basic disazo-dyestuffs obtained by treating meta-nitraniline with chloracetyl-chloride and pyridine, reducing the nitro compound to an amino compound, diazotizing the body thus obtained, coupling the diazo compound with pyrido-acetylmeta-phenylenediamine, again diazotizing and finally coupling the beta-naphthol, said azo-dyestuffs having the formula:

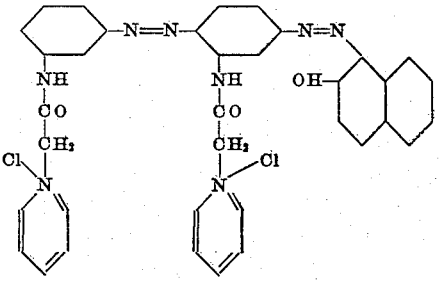

and being soluble in water and dyeing tannin-mordanted cotton a pure bluish-red, very fast to washing, and weighted silk a tint very fast to light and to washing.

In witness whereof I have hereunto signed my name this 3rd day of December, 1931.

ACHILLE CONZETTI.